(12) United States Patent
Lingens et al.

(10) Patent No.: US 9,546,592 B2
(45) Date of Patent: Jan. 17, 2017

(54) CONTROLLING A COMPRESSION RELEASE BRAKE

(71) Applicant: DAF Trucks N.V., Eindhoven (NL)

(72) Inventors: Andreas Lingens, Eindhoven (NL); Roel Peters, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 84 days.

(21) Appl. No.: 14/405,960

(22) PCT Filed: Jun. 6, 2013

(86) PCT No.: PCT/NL2013/050399
§ 371 (c)(1),
(2) Date: Dec. 5, 2014

(87) PCT Pub. No.: WO2013/183997
PCT Pub. Date: Dec. 12, 2013

(65) Prior Publication Data
US 2015/0144097 A1 May 28, 2015

(30) Foreign Application Priority Data

Jun. 7, 2012 (EP) .................................... 12171144

(51) Int. Cl.
*F02B 37/22* (2006.01)
*F02D 41/00* (2006.01)
(Continued)

(52) U.S. Cl.
CPC .............. *F02B 37/22* (2013.01); *F01L 13/065* (2013.01); *F02B 37/24* (2013.01); *F02D 9/06* (2013.01);
(Continued)

(58) Field of Classification Search
CPC ................ F02D 9/06; F02D 9/08; F02D 9/10;
F02D 13/04; F02D 41/0005; F02D 41/0007; F02D 41/0055; F02D 41/26; F02D 41/263; F02D 220/0406; F02D 2250/34; F02B 37/025; F02B 37/22; F02B 37/24; F01L 1/181; F01L 13/065; Y02T 10/144; Y02T 10/47
(Continued)

(56) References Cited

U.S. PATENT DOCUMENTS 6,497,097 B2 * 12/2002 Schmidt ................ B60T 13/585
123/320
6,594,996 B2 * 7/2003 Yang ....................... F02B 37/24
123/321

(Continued)

FOREIGN PATENT DOCUMENTS

WO     2008/008005 A1     1/2008

OTHER PUBLICATIONS

International Search Report—PCT/NL2013/050399—Dated Jul. 17, 2013.

*Primary Examiner* — John Kwon
*Assistant Examiner* — Johnny H Hoang
(74) *Attorney, Agent, or Firm* — Banner & Witcoff, Ltd.

(57) ABSTRACT

A method and a system are described for a compression release brake in an engine comprising an exhaust manifold connected to a turbine provided with a variable turbine geometry wherein said turbine is further connected to a back pressure valve for controlling the pressure drop over said turbine wherein the method comprises the steps of: controlling said back pressure valve on the basis of a measured engine speed and a desired braking power; calculating a desired exhaust manifold gas pressure on the basis of said measured engine speed and said desired braking power; and, controlling said variable turbine geometry such that the difference between a measured exhaust manifold gas pres- (Continued)

sure and said calculated desired exhaust manifold gas pressure is minimized.

17 Claims, 4 Drawing Sheets

(51) Int. Cl.
    *F02B 37/24*     (2006.01)
    *F02D 9/06*     (2006.01)
    *F01L 13/06*     (2006.01)
    *F02D 41/26*     (2006.01)
    *F02D 41/14*     (2006.01)

(52) U.S. Cl.
    CPC ......... F02D 41/0007 (2013.01); F02D 41/263 (2013.01); *F02D 41/1448* (2013.01); *F02D 2200/0406* (2013.01); *F02D 2200/101* (2013.01); *F02D 2200/703* (2013.01); *F02D 2250/34* (2013.01); *Y02T 10/144* (2013.01)

(58) Field of Classification Search
    USPC .............. 123/321–323, 559.1; 60/502, 605.2
    See application file for complete search history.

(56) References Cited

U.S. PATENT DOCUMENTS

| | | | |
|---|---|---|---|
| 8,931,456 B2* | 1/2015 | Rammer | ................. F01L 1/181 |
| | | | 123/321 |
| 2002/0092300 A1 | 7/2002 | Schmidt et al. | |
| 2002/0174849 A1* | 11/2002 | Ruggiero | ................. F01L 13/06 |
| | | | 123/319 |
| 2009/0182487 A1* | 7/2009 | Halleberg | ........... F02D 41/1497 |
| | | | 701/106 |
| 2011/0036088 A1* | 2/2011 | Xin | ........................... F02D 9/06 |
| | | | 60/605.1 |
| 2011/0100324 A1* | 5/2011 | Xin | ........................ F02D 13/04 |
| | | | 123/322 |
| 2011/0120411 A1* | 5/2011 | Ren | ........................... F01L 1/26 |
| | | | 123/321 |

* cited by examiner

CONTROLLING A COMPRESSION RELEASE BRAKE

CROSS-REFERENCE TO RELATED APPLICATIONS

This application is a U.S. National Stage application under 35 U.S.C. §371 of International Application PCT/NL2013/050399 (published as WO 2013/183997 A1), filed Jun. 6, 2013, which claims priority to Application EP 12171144.4, filed Jun. 7, 2012. Benefit of the filing date of each of these prior applications is hereby claimed. Each of these prior applications is hereby incorporated by reference in its entirety.

FIELD OF THE INVENTION

The invention relates to cent rolling compression release breaking in an engine, and, in particular, though not exclusively, to a method and system for controlling a compression, release brake in an internal combustion engine comprising a turbocharger with variable turbine geometry, a compression release brake controller for use in such system and a computer program product using such method.

BACKGROUND OF THE INVENTION

In an internal combustion (IC) engine having a variable turbine geometry (VTG) type turbocharger, the resistance of the turbine and energy delivered by the turbine to the compressor can be controlled by adjusting the flow area of the intake of the turbine. When using such VTG, adjustment of the flow area may be achieved by rotating the turbine vanes in a certain position or transferring a sliding wall within the turbine to a certain position. Adjustment of the VTG has a direct effect on the pressure in the inlet and exhaust manifolds. The braking power of a compression brake in an IC engine depends on the gas pressure in the inlet and exhaust manifolds so that the control of the flow area of the VTG provides the possibility to control the braking power. In particular, varying the flow area of the VTG controls the braking power.

However, during the time a compression release brake is active, the relation between e.g. the vane position of the VTG turbine and gas pressure in the inlet and exhaust manifolds is not constant. This may be due to the fact that the gas temperature in the engine does not remain constant and hardware parts expand or shrink with as a function of the temperature, which can result in alterations in leakage flow and functioning of that hardware (e.g. a change in the actual VTG position due to changes in expansion ratio of linkage arms). Furthermore, piece-to-piece variation of the turbocharger results in a spread in mass flow and actual VTG position, which ultimately will result in a spread of the gas pressures in the inlet and exhaust manifolds.

Variations in the VTG position can be particularly a problem when, the flow area of the intake of the turbine is small. In these situations the gas pressure in the exhaust manifold is very sensitive for the VTG position. A slight error in VTG position can result in a large gas pressure deviation, in the exhaust manifold.

This system behaviour makes it impossible or at least very difficult to obtain a fast, response with stable and reliable braking power output on the basis of preselected VTG positions. This effect has a profound impact on the usability of the compression release brake. In a reliability aspects it may be a risk for various engine components, which can break down in case too ouch gas pressure in the exhaust manifold and/or too much engine braking torque is generated. For manual engine braking, but also for engine braking requested by vehicle functions such as cruise control, the variance in engine brake power can cause comfort problems or even safety issues.

Therefore, when using a turbocharger equipped with VTG, it is essential to control the VTG position based on a closed loop control on the gas pressure in the inlet and/or exhaust manifolds to provide constant and reliable braking power with a fast response. The closed loop control adjusts the vane or sliding wall, position of the turbine such that for a particular set of engine parameters, maximum braking power can be achieved.

Certain turbine parameters however, such as the turbine speed, may not exceed a predetermined maximum. Therefore, at higher engine speeds, controlling the VTG flow area to small values would substantially increase the risk that the turbine speed exceeds a maximum tolerable turbine speed. This effect may substantially reduce the operating range of the engine brake. Hence, for known engine brake control systems it is not possible or it is at least very difficult to maintain maximum braking power at high motor speeds and/or at nigh altitudes.

Hence, there is a need in the art for improved method and systems for controlling engine braking of an engine comprising a variable turbine geometry turbocharger.

SUMMARY OF THE INVENTION

It is an objective of the invention to reduce or eliminate at least one of the drawbacks known in the prior art. In a first aspect the invention may relate to a method for controlling a compression release brake in an engine comprising an exhaust manifold connected to a turbocharger provided with a variable turbine geometry turbine wherein said turbine is further connected to a back pressure valve for controlling the pressure drop over said turbine, wherein the method may comprise: controlling said back pressure valve on the basis of a measured engine speed and a desired braking power; determining a desired exhaust manifold gas pressure on the basis of at least said measured engine speed and said desired braking power; and, controlling said variable turbine geometry such that the difference between a measured exhaust manifold gas pressure and said determined desired exhaust manifold gas pressure is minimized. The method allows exhaust manifold gas pressure control based on combined control of the VTG and the BPV. Such combined control provides significant improvement on the produced brake power, in particular at higher engine speeds and/or high altitudes.

In an embodiment, said desired exhaust manifold gas pressure may be determined on the basis of an exhaust manifold gas pressure function $p_{exh}=f(n,P_s)$, which may be dependent on the measured engine speed n and a desired breaking power $P_s$. In another embodiment, said predetermined exhaust manifold gas pressure function may be implemented as a look-up table in a memory comprising at least exhaust manifold gas pressure values stored as a function of at least the engine speed and a desired brake power, in yet another embodiment said desired exhaust manifold gas pressure function may be dependent on the engine speedy the ambient air pressure and the desired braking power $p_{exh}=f(n,p_a,P_s)$ or dependent on the engine speed, the inlet manifold air pressure and the desired braking power $p_{exh}=f(n,p_i,P_s)$. In an embodiment, said back pressure function may be dependent on the engine speed, the ambient air pressure and the desired braking power: $Y_{BPV}=f(n,p_a,P_s)$; or, may be dependent on the engine speed, the air inlet manifold pressure and the desired braking power; $Y_{BPV}=f(n,p_i,P_s)$. Hence, in these embodiments, one or more preconfigured functions may be used to control the VTG and BPV position as a function of various engine parameters. Preferably, the VTG position $Y_{BPV}$ is controlled in a closed control loop wherein difference between the measured and desired exhaust manifold gas pressure is minimized and wherein the engine speed, desired brake power and the ambient air pressure or air inlet manifold gas pressure may be used as engine parameters to determine a desired, exhaust manifold gas pressure. The BPV position is controlled in an open control as a function of the engine speed, a desired brake power and, optionally, the ambient air pressure or air inlet manifold gas pressure. The combined use of a closed and open control loop provides a stable control system for controlling the VTG and BPV such that maximum, brake power at high, engine speeds and low ambient air pressures (e.g. at high altitudes) can be provided.

In yet another embodiment, the controlling of said variable turbine geometry may comprise: receiving a desired exhaust manifold gas pressure; determining a desired variable turbine geometry using said, desired exhaust manifold gas pressure and said measured manifold gas pressure; sending a control signal associated with said desired variable turbine geometry to one or more actuators for configuring said turbine into said desired variable turbine geometry.

In an embodiment, controlling said back pressure valve may comprise: determining a back pressure valve position; sending a control signal associated with said back pressure valve position to at least one actuator for configuring said back pressure value into said back pressure valve position.

In an embodiment, said variable turbine geometry and said back pressure valve may be controlled such that maximum exhaust manifold gas pressure is achieved while keeping the turbine speed below a predetermined maximum value. In one embodiment above a predetermined engine speed threshold value $n_T$, the BPV may be closed as a function of the engine speed in order to keep the turbine speed below a maximum allowable speed, while at the same time allowing maximum brake power. In another embodiment, above a predetermined engine speed threshold value $n_T$, the BPV position, may be controlled between a 100% open position and a 40% open position, while the VTG position may be controlled between a 10% open position and a 30% open position in order to keep the turbine speed below a maximum allowable speed, while at the same time allowing maximum brake power. Hence, by (partly) closing the BTV, the speed of the turbine can be kept below a certain maximum so that negative effects associated with too high turbine speeds can be avoided and maximum brake power at high engine speeds and/or predetermined ambient gas pressures and/or air inlet manifold gas pressures is achievable.

In an embodiment, controlling said variable turbine geometry may comprise: actuating one or more rotatable vanes of a variable geometry turbine; and/or, a sliding wall within the turbine.

In another embodiment, said method may further comprise: receiving a request for a desired braking power.

In another aspect, the invention may relate to a compression release brake controller in an engine comprising an exhaust manifold connected to a turbine provided with a variable turbine geometry wherein said turbine is further connected to a back pressure valve for controlling the pressure drop over said turbine, wherein said controller may be configured for: controlling said back pressure valve on the basis of a measured engine speed and a desired braking power; determining a desired exhaust manifold gas pressure on the basis of at least said measured engine speed and desired braking power; and, controlling said variable turbine geometry such that the difference between a measured exhaust manifold gas pressure and said calculated desired exhaust manifold gas pressure is minimized.

In yet another aspect, the invention may relate to a system for controlling a compression release brake in an engine comprising an exhaust manifold connected to a turbine provided with a variable turbine geometry, wherein said system may comprise: an engine speed sensor; an exhaust manifold gas pressure sensor; a back pressure valve connected to the output of said turbine for controlling the pressure drop over said turbine; and, an engine brake controller configured for receiving a request for a desired braking power; for controlling said back pressure valve on the basis of an engine speed measured by said engine speed sensor and said desired braking power; for calculating a desired exhaust manifold gas pressure on the basis of said measured engine speed and desired braking power; and, for controlling said variable turbine geometry such that the difference between a measured exhaust manifold gas pressure and said calculated desired exhaust manifold gas pressure is minimized.

The invention may further relate to a computer program product, implemented on computer-readable non-transitory storage medium, wherein the computer program, product may be configured for, when run on a computer, executing any of the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
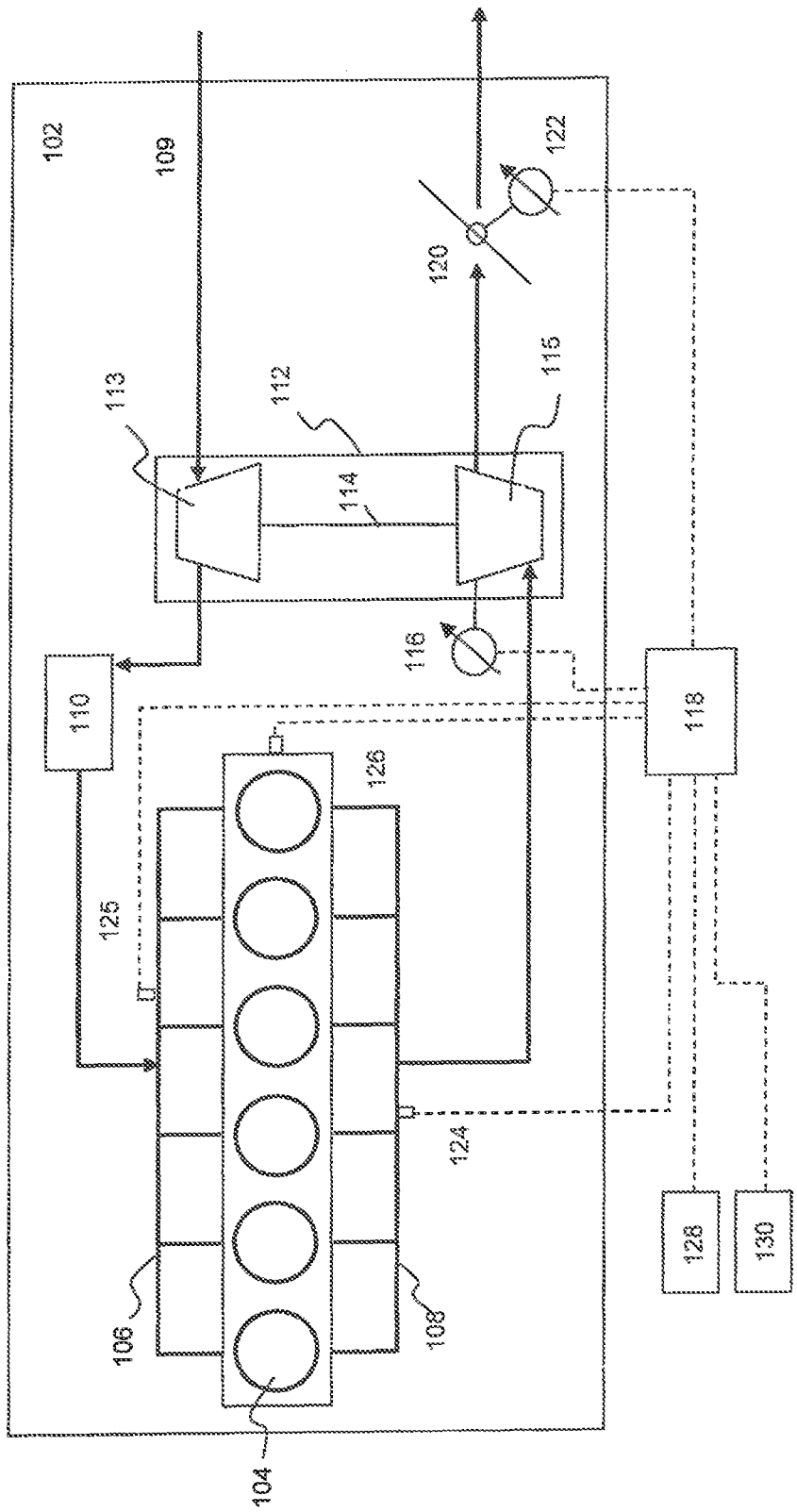
FIG. 1 schematically depicts at least part of an internal combustion engine according an embodiment of the invention.

FIG. 1 schematically depicts at least part of an internal combustion engine comprising a compression release brake system according an embodiment of the invention. In particular, FIG. 1 depicts at least part of an internal combustion engine 102 of at vehicle, comprising cylinders 104, e.g. six cylinders, provided with pistons, which are provided with an inlet manifold 106 and an exhaust manifold 108. The engine is further provided with a turbocharger 112 comprising a compressor 113 for generating compressed air, which is fed through a charge air cooler 110 so that it is cooled down before the compressed air is guided to the inlet manifold.

The compressed air is fed into the cylinders through the inlet manifold by opening adjacent air valves. The compressed air is fed into the cylinders through the inlet manifold by opening adjacent air valves. At the end of the compression stroke the exhaust valves located in the cylinders are opened so that the compressed air in the cylinders is fed via the exhaust manifold to the turbine 115 before the piston in the cylinder has reached, top dead centre. A rigid shaft 114 connecting the turbine and the compressor is configured to transfer the rotary energy of the exhaust gas driven turbine to the compressor so that a constant flow of compressed air originating from an air inlet 109 is fed into the inlet manifold.

The turbine may be configured as a variable turbine geometry (VTG) turbine. In a VTG turbine, the flow area of the turbine intake can be adjusted. In one embodiment, the flow area may be increased or decreased by moving a sliding wall surrounding the turbine wheel to or away from the turbine shroud plate. The sliding wall in the VTG may be connected to a mechanism, which is driven by a position-controlled, actuator 116. The actuator is connected to the engine control unit (ECU) 118, which is configured to control the VTG actuator and to receive feedback from the VTG actuator.

After the exhaust gas has passed the turbine, it is fed through a valve 120, e.g. a butterfly valve, located at a particular point in the downstream the exhaust channel. This valve may be referred to as a backpressure valve (BPV). The exhaust gas may be led through an after-treatment system before the exhaust gas enters the atmosphere. The BPV may be driven by a position-controlled actuator 122, which is controlled by the ECU. When closing the BPV, the pressure drop across the turbine may be reduced resulting in a decrease in turbo speed and (as a consequence) a decrease in inlet gas pressure.

The ECU may comprise controlling software in order to set the engine braking mode. In particular, the ECU may be configured to regulate pressure in the various parts of the engine by controlling the values, in particular the VTG and the BPV, on the basis of the engine parameters such that a desired level of engine braking is achieved without exceeding predetermined system limits such as temperature, pressure and/or turbine speed. To that end, the ECU may receive information associated with various engine parameters. For example, the ECU may receive the exhaust manifold gas pressure measured by a exhaust manifold pressure sensor 124 located in the exhaust manifold and the engine speed measured by an engine speed sensor 126. The ECU may further receive the air inlet gas pressure measured by an air inlet manifold pressure sensor 125, the ambient air pressure measured by a pressure sensor 128 which is located external of the engine and/or a desired brake power demand 130.

The ECU may comprise a processor for executing an engine braking control algorithm for electronically controlling the charging of the cylinders in a feedback loop. The cylinders are charged with air originating from the air inlet manifold and exhaust gas originating from the exhaust manifold at the beginning of the compression stroke. Hence, the braking power at sea level $P_s$ may therefore be defined as a function of various engine parameters: $P_s=f(n,p_i,p_{exh})$, wherein n represents the engine speed; $p_i$ represents the gas pressure in the inlet manifold and $p_{exh}$ the exhaust gas pressure in the exhaust manifold.

Figure 2:
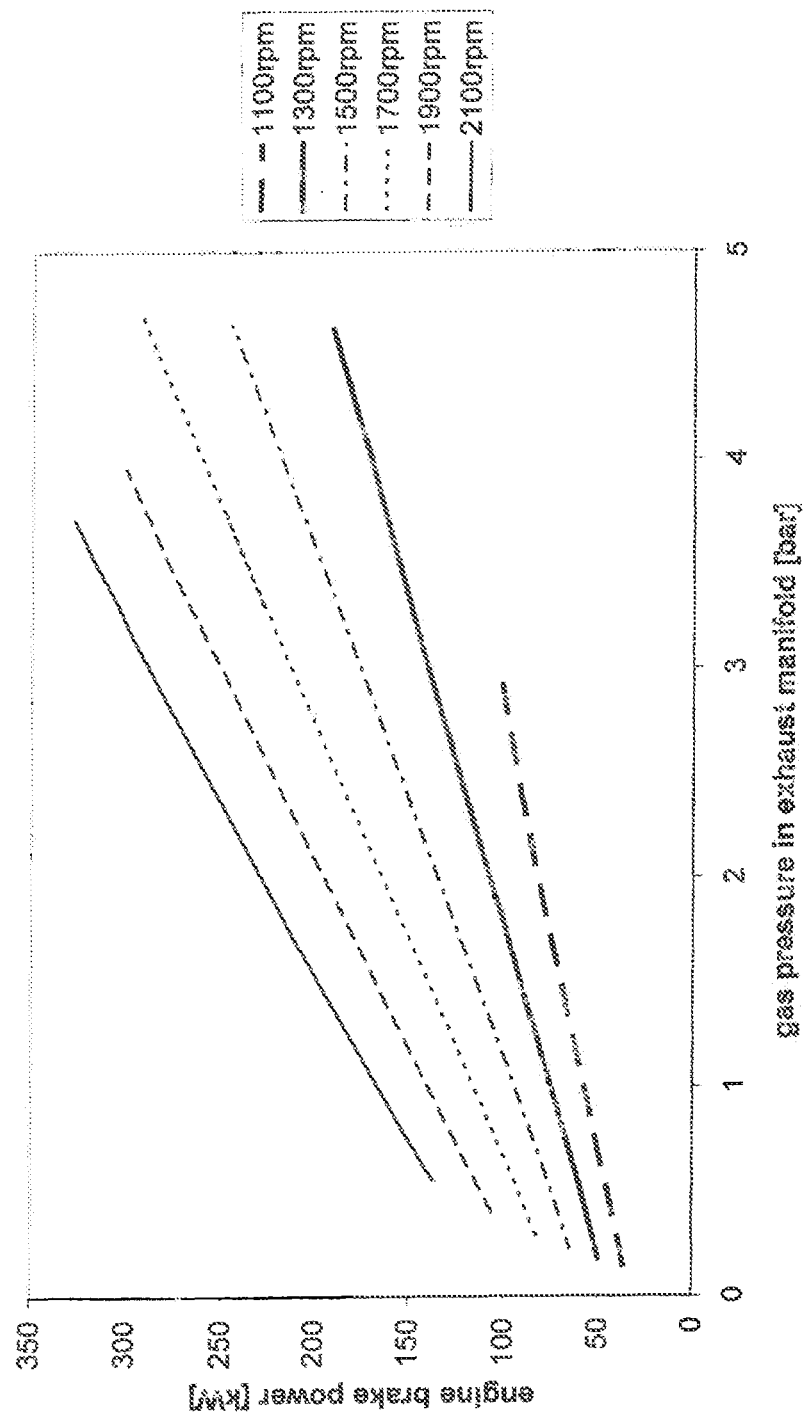
FIG. 2 depicts the braking power output as a function of the exhaust manifold gas pressure for various values of the engine speed.

FIG. 2 depicts the braking power output as a function of the exhaust manifold gas pressure for various values of the engine speed, $P_s=f(n,p_{exh})$. When in operation, the flow area of the VTG may be reduced, so that the exhaust gas will have an increased amount of kinetic energy, which will be transferred to the turbine wheel thereby increasing the turbine speed. Hence, decreasing the flow area of the VTG will thus both increase the gas pressure at the inlet manifold and the exhaust manifold resulting in a predetermined braking power.

The test, results in FIG. 2 indicate that a normal operating range may be defined wherein the brake power output shows a substantially linear dependency on exhaust gas pressure in the exhaust manifold at constant engine speed. Hence, in this operating range, the sliding wall and/or rotatable vanes in the VTG may act like a throttle and provide the possibility to increase the gas pressure in the exhaust manifold by decreasing the flow area of the intake of the VTG. Therefore, controlling the VTG by adjusting the position of a sliding wall and/or one or more rotatable vanes provides controllability of the engine braking power output.

Figure 3:
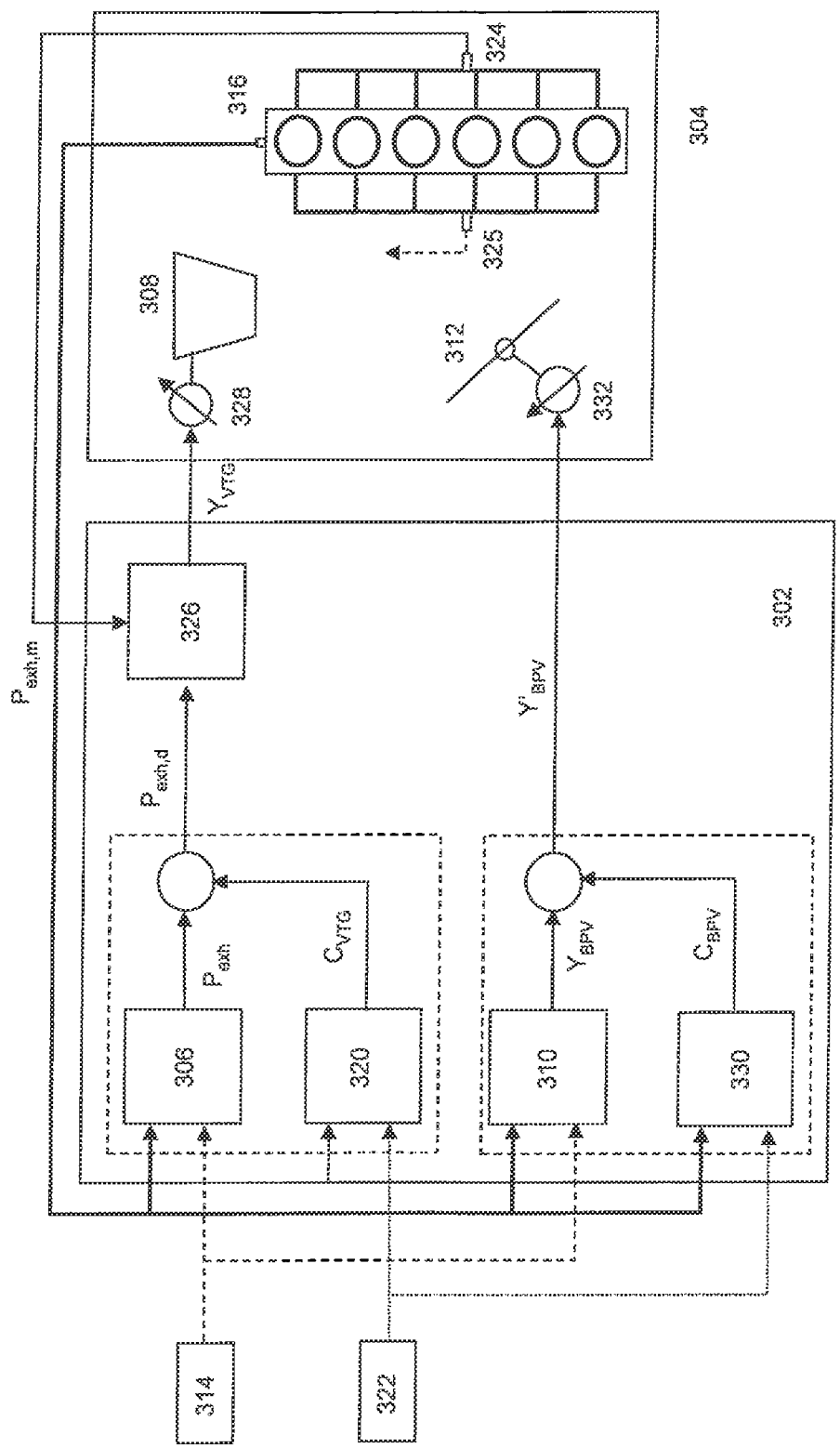
FIG. 3 depicts a schematic of a compressing release braking system according to an embodiment of the invention.

FIG. 3 depicts a schematic of a compression release braking system according to an embodiment of the invention. In particular, FIG. 3 depicts a compression release system comprising an ECU 302 configured for determining and sending control signals to the engine 304 and for receiving feedback signals, in particular feedback signals associated with measured engine parameters, from the engine. In one embodiment, the ECU may comprise an exhaust manifold gas pressure function 306 which is used to control a VTG 308 in the engine. The ECU may further comprise a BPV position function 310 for controlling the position of the BPV 312 in the engine. In one embodiment, the VTG and the PBV may be arranged in accordance with the system described with reference to FIG. 1.

The exhaust manifold gas pressure function 306 is defined and implemented in the ECU on the basis the measured data in FIG. 2. It allows determination of a (desired) exhaust manifold, gas pressure as a function of the engine speed and the braking power: $p_{exh}=f(n,P_s)$. The function may be implemented in the ECU in any suitable way. In one embodiment, the exhaust manifold gas pressure values may be stored as a exhaust manifold gas pressure look-up table (LUT) in the memory associated with the ECU (not shown).

In one embodiment, the inlet manifold gas pressure $p_i$ is considered to be a follower value of VTG position and $p_{exh}$ so that variations in $p_i$ are not taken into account when constructing the exhaust manifold gas pressure function. In another embodiment, also $p_i$ may be taken into account constructing the manifold gas pressure function: $p_{exh}=f(n, p_i, P_s)$. In that case, the influence of e.g. flow resistances at the air inlet side is also into account.

Hence, the ECU may determine a predetermined exhaust manifold gas pressure $p_{exh}$ on the basis of the measured engine speed n and a desired braking power P in a pre-configured exhaust manifold gas pressure look-up table. This way, the effective flow area of the VTG may be set to a certain position so that a desired braking power is achieved.

Decreasing the flow area of the VTG, increases the turbo speed. However, as the turbine speed is limited to a particular maximum, the allowable flow area of the VTG cannot be decreased unlimited. Hence, for certain engine operation regions, in particular operation regions associated with high engine speeds, a maximum desired brake power may not be achieved due to the lack of gas pressure build up in the exhaust manifold. In order to alleviate this problem, the ECU is configured to control the exhaust manifold, gas pressure on the basis of the VTG in conjunction with the BPV as depicted in FIG. 3. Thus, in order to prevent the turbine speed from, entering a region of unallowable turbine speed values, the BPV may be controlled to decrease the pressure drop across the turbine. This way the exhaust, gas pressure and thus the braking power may be kept high, while keeping the turbine speed within its operation range.

In order to control the BPV in conjunction with the VTG, a BPV position function 310 may be defined which allows determining of the valve positions $Y_{BPV}$ of the BPV as a function of engine parameters. In one embodiment, the BPV position function may be defined as a function of the engine speed and the braking power $Y_{BPV}=f(n,P_s)$. Positions of the BPV as a function of these parameters may be stored in the memory of the ECU as a BPV position look-up table. The ECU may use the exhaust manifold gas pressure look-up table and BPV position look-up table in order to control, the exhaust manifold gas pressure as a function of the VTG and BPV settings. This way, a compression release brake system is achieved which is configured, to provide a high maximum braking power over an extended ranged of engine speeds.

The process executed by the ECU may be triggered by an external brake power request signal 314 for generating a desired engine braking power P. The request signal may be generated by a manual braking system or a predetermined vehicle function such as a cruise control system. The ECU may further receive engine parameters such as the engine speed n 316 and the exhaust manifold gas pressure $p_{exh}$ 324. The ECU may use the manifold exhaust gas look-up table to calculate a desired exhaust manifold gas pressure $p_{exh}$ on the basis of input variables n and P.

The ECU may further comprise a VTG ambient pressure correction function $C_{VTG}=f(n,p_a)$ 320 for calculating VTG correction values $C_{VTG}$. A VTG correction may be required as the relation between the VTG position, $p_{exh}$ and $p_i$ may vary with respect to variations in the ambient air pressure (note that the compressor air inlet is connected to the ambient air). Hence, the ECU may be configured to receive an ambient air pressure value $p_a$ from an ambient air pressure sensor 322 and to calculate a VTG correction value which is subsequently used to calculate a desired exhaust manifold gas pressure $p_{exh,d}$ (which is corrected for the ambient pressure) using a predetermined relation between the VTG correction value and the exhaust pressure at sea level: $p_{exh,d}=f(p_{exh},C_{VTG})$. In another embodiment, instead of a separate VTG ambient pressure correction function, a desired exhaust manifold gas pressure function $p_{exh,d}=f(n,p_a,P_s)$ may be determined.

A comparator 326, which may be configured to receive measured exhaust manifold gas pressure values $p_{exh,m}$, may subsequently determine the difference between the actual measured exhaust manifold gas pressure $p_{exh,m}$ 324 and the desired exhaust manifold gas pressure $p_{exh,d}$ and determine a new desired VTG position $Y_{VTG}=f(p_{exh,m},p_{exh,d})$ such that the difference between the desired and measured exhaust manifold gas pressure is minimized. The calculated position $Y_{VTG}$ associated with the VTG is thereafter transmitted in a signal to the VTG actuator 328, which, positions the VTG in accordance with that signal.

In another embodiment, in addition to the VTG correction values, the ECU may further comprise a BPV ambient pressure correction function $C_{BPV}=f(n,p_a)$ 330 for calculating BPV position correction values $C_{BPV}$. This correction value may be required as the relation between the BPV position, $p_{exh}$ and $p_i$ may also vary with respect to variations in the ambient air pressure. Hence, on the basis of an ambient pressure and a measured engine speed a BPV position correction value may be determined which is subsequently used in calculating a corrected BPV position value $Y'_{PBV}$ which is subsequently sent to the BPV actuator 332, which positions the BPV in accordance with that signal. In another embodiment, instead of a separate BPV ambient pressure correction function, a corrected BPV position function $Y'_{PBV}=f(n,p_a,P_s)$ may be determined. Instead of the ambient pressure, in some embodiment, the measured air inlet manifold gas pressure $p_i$ 325 may be used to determine a desired exhaust manifold gas pressure function $p_{exh,d}=f(n,p_i,P_s)$ and/or a corrected BPV position function $Y'_{PBV}=f(n,p_i,P_s)$. In that case, effects associated air inlet flow resistance on the generated brake power may also be taken into account.

Figure 4:
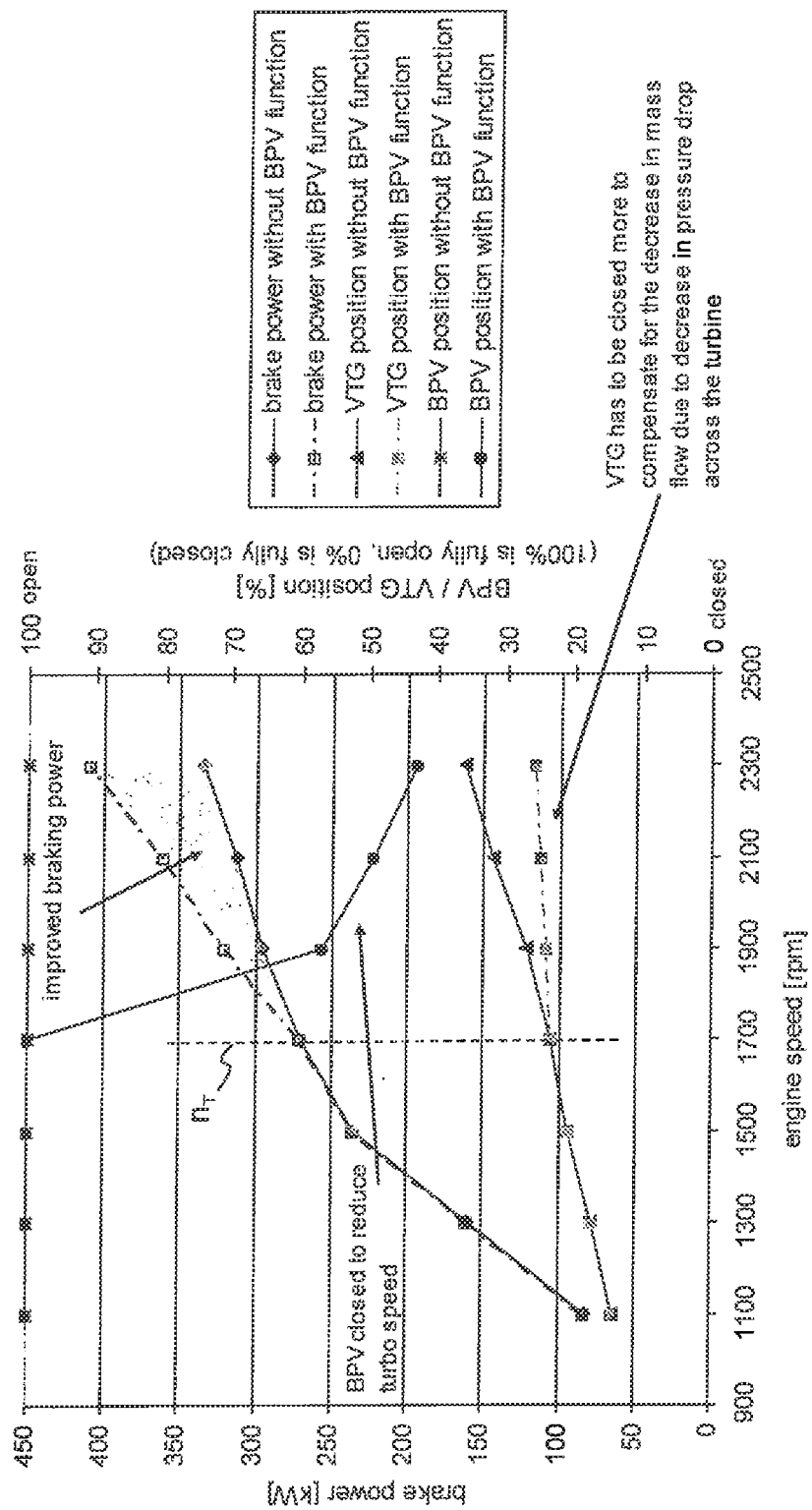
FIG. 4 depicts the maximum available brake power as a function of engine with and without the use of a BPV control according to an embodiment of the invention.

FIG. 4 depicts the maximum available brake power as a function of engine speed, with and without the use of a BPV control according to an embodiment of the invention. FIG. 4 further depicts the control of the VTG and BPV positions as a function of engine speed in order achieve the desired improved brake power control. As can be clearly derived from the graphs, for engine speeds up to a certain value (in this particular configuration around 1600-1700 rpm), the brake power increases approximately linearly wish the engine speeds. In this region, the BPV position is fully open and the exhaust pressure may be controlled solely by opening the inlet area of the VTG when the engine speed increases. For engine speeds higher than a predetermined threshold value $n_T$, in this example approximately 1700 rpm, effects associated with the physical limitations of the turbocharger, in particular the limitations associated with the turbine speed, start to appear. The measured brake power curve without BPV control shows that, at engine speeds higher than the engine speed threshold value $n_T$, the limitations associated with the turbine speed may cause a considerable degradation in the produced brake power when no BPV control is used. Obviously, engine speed threshold value $n_T$ depends on the particular implementation of the engine and, in particular, the turbocharger.

Hence, for speeds higher than engine speed threshold value $n_T$, the ECU will start to close the BPV as a function of the engine speed in order to keep the turbine speed below its maximum allowable speed, while allow at the same time maximum brake power. As can be seen from FIG. 4, the PVB position is a non-linear function of the engine speed. In the relatively short interval after the threshold value, in this case between approx. 1700 and 1900 rpm, the ECU controls the BPV position to an approximately 60-50% open position. Thereafter, in the interval between 1900 and 2300 rpm, the BPV position is controlled to an approximately 45-40% open position. During the closing of the BPV, the VTG is slowly opened for increasing speeds. However, the rate at which the VTG is opened, is a much slower when compared with to the case with no BPV control. This is due to the fact that the VTG has no be kept more closed in order to compensate for the decrease in mass flow due to the decrease in pressure drop across the turbine.

Hence, from the above, it follows that after the engine reaches a predetermined threshold value, the ECU will start to control the VTG position in conjunction with the PBV position. In particular, the ECU will, control the BPV position between a fully opened and partially opened position open position (up to around 30-40% at high engine speeds, i.e. speeds higher than approx. 2200 rpm) as a function of the engine speed. At the same time, ECU will control the VTG position between 10-30% open as a function of the engine speed. An exhaust manifold gas pressure control based on combined control of the VTG and the BPV significantly improves the produced brake power, in particular at higher engine speeds and/or high altitudes.

One embodiment of the disclosure may be implemented as a program product for use with a computer system. The program(s) of the program product define functions of the embodiments (including the methods described herein) and can be contained on a variety of computer-readable storage media. The computer-readable storage media can be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. Method for controlling a compression release brake in an engine comprising an exhaust manifold connected to a turbocharger provided with a variable turbine geometry turbine wherein said turbine is further connected to a back pressure valve for controlling a pressure drop over said turbine, the method comprising:
controlling said back pressure valve on the basis of a measured engine speed and a desired braking power;
determining a desired exhaust manifold gas pressure on the basis of at least said measured engine speed and said desired braking power; and,
controlling said variable turbine geometry such that the difference between a measured exhaust manifold gas pressure and said determined desired exhaust manifold gas pressure is minimized.

2. Method according to claim 1 wherein said desired exhaust manifold gas pressure is determined on the basis of an exhaust manifold gas pressure function $p_{exh}=f(n,P_s)$.

3. Method according to claim 2 wherein said desired exhaust manifold gas pressure function is further dependent on, in addition to said measured engine speed and said desired braking power, an ambient air pressure $p_{exh}=f(n,p_a,P_s)$ or an inlet manifold air pressure $p_{exh}=f(n,p_i,P_s)$.

4. The method of claim 2, wherein said exhaust manifold gas pressure function is implemented as a look-up table in a memory comprising exhaust manifold gas pressure values stored as a function of at least said measured engine speed and said desired braking power.

5. Method according to claim 1 wherein said back pressure valve is controlled using a predetermined back pressure valve function for determining position information of said back pressure valve as a function of at least said measured engine speed and said desired braking power $Y_{BPV}=f(n,P_s)$.

6. Method according to claim 5 wherein said back pressure valve function is further dependent on, in addition to said measured engine speed and said desired braking power, an ambient air pressure $Y_{BPV}=f(n,p_a,P_s)$ or an inlet manifold air pressure $Y_{BPV}=f(n,p_i,P_s)$.

7. The method of claim 5, wherein said predetermined back pressure valve function is implemented as a look-up table in a memory comprising back pressure valve position values stored as a function of at least said measured engine speed and said desired braking power.

8. Method according to claim 1 wherein controlling said variable turbine geometry comprises:
receiving a desired exhaust manifold gas pressure;
determining a desired variable turbine geometry using said desired exhaust manifold gas pressure and said measured manifold gas pressure;
sending a control signal associated with said desired variable turbine geometry to one or more actuators for configuring said turbine into said desired variable turbine geometry.

9. Method according to claim 1 wherein controlling said back pressure valve comprises:
determining a back pressure valve position;
sending a control signal associated with said back pressure valve position to at least one actuator for configuring said back pressure value into said back pressure valve position.

10. Method according to claim 1 wherein said variable turbine geometry and said back pressure valve are controlled such that maximum exhaust manifold gas pressure is achieved while keeping the turbine speed below a predetermined maximum value.

11. Method according to claim 1, wherein above a predetermined engine speed threshold value $n_T$, the back pressure valve is closed as a function of the engine speed in order to keep a turbine speed below a maximum allowable speed, while at the same time allowing maximum brake power.

12. Method according to claim 1, wherein above a predetermined engine speed threshold value $n_T$, a BPV position of said back pressure valve is controlled between a 100% open position and a 40% open position, while a VTG position of said variable turbine geometry is controlled between a 10% open position and a 30% open position.

13. Method according to claim 1 wherein controlling said variable turbine geometry comprises:
actuating one or more rotatable vanes of said variable turbine geometry turbine, a sliding wall within the turbine, or both.

14. Method according to claim 1 further comprising:
receiving a request for a desired braking power.

15. A computer program product, implemented on computer-readable non-transitory storage medium, the computer program product configured for, when run on a computer, executing the method steps according to claim 1.

16. A compression release brake controller in an engine comprising an exhaust manifold connected to a turbine provided with a variable turbine geometry wherein said turbine is further connected to a back pressure valve for controlling a pressure drop over said turbine, said controller being configured for:
controlling said back pressure valve on the basis of a measured engine speed and a desired braking power;
determining a desired exhaust manifold gas pressure on the basis of at least said measured engine speed and desired braking power; and,
controlling said variable turbine geometry such that the difference between a measured exhaust manifold gas pressure and said determined desired exhaust manifold gas pressure is minimized.

17. A system for controlling a compression release brake in an engine comprising an exhaust manifold connected to a turbine provided with a variable turbine geometry, said system comprising:
an engine speed sensor;
an exhaust manifold gas pressure sensor for measuring exhaust manifold pressure;
a back pressure valve connected to the output of said turbine for controlling a pressure drop over said turbine; and, a compression release brake controller configured for receiving a request for a desired braking power; for controlling said back pressure valve on the basis of an engine speed measured by said engine speed sensor and said desired braking power; for calculating a desired exhaust manifold gas pressure on the basis of said measured engine speed and desired braking power; and, for controlling said variable turbine geometry such that the difference between a measured exhaust manifold gas pressure and said calculated desired exhaust manifold gas pressure is minimized.

* * * * *